H. C. PEARSONS
Apparatus for Finding True Meridian.
No. 166,137.                               Patented July 27, 1875.
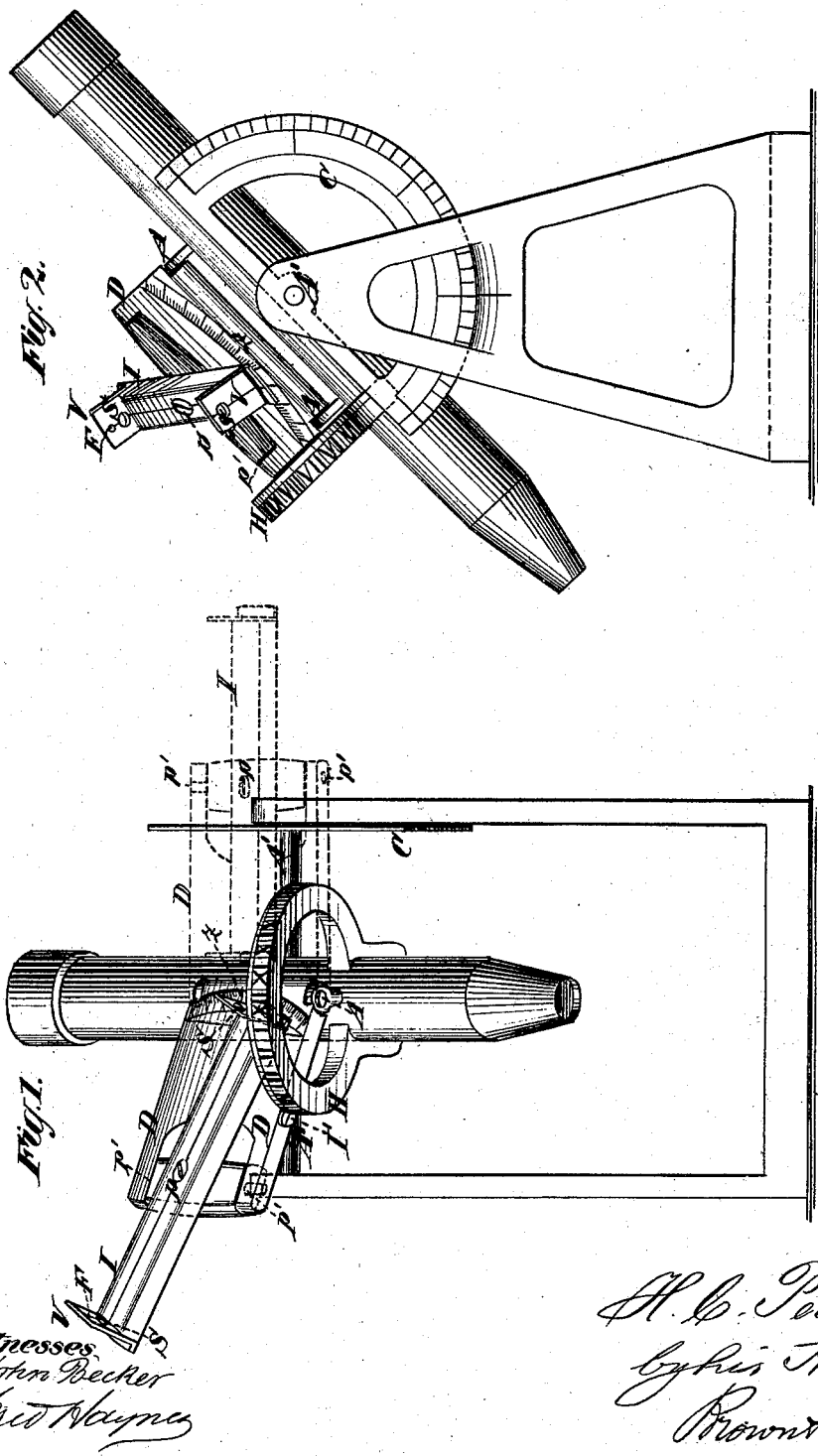

UNITED STATES PATENT OFFICE.

HARRISON C. PEARSONS, OF FERRYSBURG, MICHIGAN.

IMPROVEMENT IN APPARATUS FOR FINDING TRUE MERIDIAN.

Specification forming part of Letters Patent No. 166,137, dated July 27, 1875; application filed May 31, 1875.

*To all whom it may concern:*

Be it known that I, HARRISON C. PEARSONS, of Ferrysburg, in the county of Ottawa and State of Michigan, have invented an Improved Apparatus for Finding True Meridian, Magnetic Declination, and Solar Apparent Time; and I do hereby declare that the following is a full, clear, and exact description of the same, reference being had to the accompanying drawing, which forms part of this specification.

This invention relates to an apparatus for finding true meridian, magnetic declination, and local apparent time, and which may be used either by itself or attached to surveying and nautical instruments already in general use—chiefly the surveyor's transit, the theodolite, and the mariner's compass.

My invention consists, first, in placing the pivot of the declination-plate, or, as it is technically called, the "polar axis," parallel with the optical axis of the instrument to which the apparatus is attached, whereby important advantages are secured. My invention further consists in attaching the index-arm to the declination-plate by a gimbal or universal joint, whereby it may be brought at will to the surface of either broad face of the declination-plate, and also in graduating the index-plate on both its broad faces, whereby I am enabled to reverse the apparatus for the correction of errors otherwise arising from unavoidable imperfections in construction and adjustment; and my invention further consists in a combination of the aforementioned devices in a convenient apparatus for the determination of true meridian, declination, and local apparent time, which can be used either by navigators at sea, or in connection with the surveyor's transit-instrument, or a theodolite, on land.

In the accompanying drawing, Figure 1 is a view from the back or eye-piece end of a transit-instrument with my apparatus attached. Fig. 2 is a side view of the same.

D is the declination-plate. Its two faces are parallel with each other, and also with the optical axis of the telescope. It is pivoted to the telescope in such a manner that the pivot A, upon which it revolves, is parallel with the optical axis of the telescope; or, the pivot A being dispensed with, the tube of the telescope itself may become the equivalent of the pivot A. This latter method will be, perhaps, preferable in all those instruments carrying the telescope some distance above the transverse axis A', as in the theodolite. The declination-plate D has on each face a zero-line, Z, which is at right angles with the polar axis A. The plate D is also graduated alike on both faces, and in both directions from the zero-lines, for the purpose of setting off the declination of any heavenly body. To the declination-plate D the index-arm I is attached by means of the cross-pivots $p$ $p'$, making a universal or gimbal joint, so that the index-arm I may be turned to rest upon the surface of either of the two faces of the declination-plate D. The index-arm carries a vernier-plate, V, at each end. Each of these vernier-plates carries a small lens placed in a socket, S, and a focal point, F. The lines joining each lens of the index-arm, with the corresponding focal point at the other end of the index-arm, are parallel with each other, and with the faces of the declination-plate D. On the edge of the declination-plate D there is, moreover, a time-index, I', for use with the hour-circle H. H is the hour-circle. It has its plane perpendicular to the optical axis of the telescope. Its arc is concentric with the pivot A, about which the declination-plate revolves, which pivot is also the polar axis of the apparatus. This hour-circle is divided into hours and subdivisions of an hour, which are read by the aid of the index I', carried on the edge of the declination-plate D.

When the several parts of the instrument to which the apparatus is applied are in adjustment with each other, and with the several parts of the solar apparatus, the following conditions must prevail in an observation for time or meridian, viz: First, the azimuth-circle of the instrument to which my improvement is attached must be parallel with the horizon. Second, the vertical or altitude circle C must have its plane parallel with the plane of the meridian. Third, the optical axis of the telescope must be parallel with the axis of the earth; then the faces of the declination-arc and the axis about which it revolves, or the polar axis, will also be parallel with the axis of the earth. Fourth, the plane of the hour-circle must be parallel with the plane of the equator; then the revolving of the declination-arc will represent diurnal motion, which may be measured in right ascension or time on the hour-circle. Fifth, the two axes of motion in the universal joint or gimbal I, by which the index-arm is hinged to the declination-plate, must be respectively parallel and perpendicular to the polar axis or pivot A.

The peculiar advantage gained by placing the so-called polar axis parallel to the optical axis of the instrument is as follows: The polar axis being parallel to the optical axis, whenever the vertical circle is adjusted to the latitude of any place—that is, turned toward the earth's equator through an arc of as many degrees, minutes, and seconds as there are in the latitude of the place of observation—and when the optical axis of the telescope is brought into the plane of the meridian of the place of observation, it—the polar axis—will be parallel to the earth's axis, and may represent the earth's axis in any motion of other parts about it, intended to typify either actual motions of the earth or apparent motions of heavenly bodies about the earth's axis.

Having thus described the parts of my apparatus and their adjustment, I will describe the method of making an observation with it when used as a solar attachment to a transit-instrument. To determine true meridian, magnetic declination, and local apparent time, knowing the latitude: Having reduced the sun's declination, as given in the Nautical Almanac, to the time and place of observation, set the same off on the declination-arc D; then, first, set the time-index I' approximately to the time of the day; second, set off from the lower zero of the vertical circle C of the transit-instrument the latitude of the place; third, set the telescope of the instrument approximately to the meridian by means of the compass-needle of the instrument, being careful not to disturb the adjustments already made for declination and latitude; fourth, then, having carefully leveled it, turn the whole instrument in azimuth on its vertical spindle, either to the right or to the left, and turn the declination-plate D backward or forward in regard to time, as may be required, till the sun's rays fall from a lens at one end of the index-arm I on its opposite focal point F', when, bating the effect of refraction, the optical axis of the telescope will be in the true meridian. The time-index I' will point on the hour-circle to the time of the day, and the compass-needle of the instrument, having settled, will indicate the magnetic declination.

The adjustment for refraction is made in the same way as for the solar compass and other forms of solar transits.

The apparatus may be rendered more perfect without in any way modifying the principle of its construction, by using clamp and tangent screws, by putting verniers on the vernier-plates V, and by the use of other refinements not represented in the drawing. The focal points F should also be inclosed in concentric circles whose radiuses are the tangents of arcs of 5', 10', &c., of arc, in a radius equal to the distance between the lenses and the focal point F on the vernier-plates on the index-arm I, to help in correcting for refraction. By graduating both faces of the declination-plate D in opposite directions from the zero-lines on this plate, and by attaching the index-arm I to the plate D by a universal joint, $p\ p'$, I am enabled to reverse the declination-plate D—a property possessed by no solar apparatus in use now known to me, a property invaluable in all instruments employed for measuring angles, as it enables the mean of two observations to be taken for the elimination of errors arising from imperfections that exist even in the finest workmanship, and also the elimination of errors in adjustment.

I reverse as follows: Having made one observation and marked the direction of the meridian, or noted the magnetic declination, or time, as may be desired, I first turn the horizontal circle of the instrument to which my solar apparatus is applied one hundred and eighty degrees in azimuth; second, I set off the latitude on the opposite side of the zero of the altitude-circle C; third, I turn the declination-arc D to the opposite side of the meridian or 12-o'clock mark obtained by the previous observation; fourth, I turn the index-arm to the opposite face of the declination-plate; and, lastly, set off the declination from the other side of the zero-line. Then a new observation may be had on points of the instrument directly opposite to those first employed.

It should be observed that in the reversed observation the time is read by its complement, the hour-circle being graduated in only one direction—that is to say, the indicated time must be subtracted from twelve to find the actual time.

For nautical purposes I dispense with the telescope and with the azimuth-circle, also with the usual support of the surveyor's transit-instrument. In place of the tripod-stand usually employed, I use a rigid standard supplied with a foot, by which the instrument may be conveniently placed upon a table or stand when not in use. I retain the cross-levels, the compass, and the vertical axis.

The pivot or polar axis A is placed parallel with the vertical circle C, and also parallel with a line which would form the optical axis of the telescope, were a telescope used the same as when attached to the transit-instrument. When so arranged, I call my apparatus, for want of a better name, a "nautical transit."

The manipulation of the solar apparatus, when thus modified, is precisely the same as in the surveyor's transit, except that the nautical transit must be held in the hand during the observation, while the surveyor's transit is mounted on a tripod; but to make this difference in the use of the apparatus under the different circumstances more obvious, I will describe an observation made by my nautical transit.

To find true meridian, local time, and magnetic declination, knowing the latitude and solar declination, first adjust the vertical circle C to the latitude of the place, and clamp it fast, holding the instrument in the left hand, in such a manner that when the polar axis or pivot A is in the meridian it will also be parallel to the earth's axis. Second, reduce the solar declination, as given in the Nautical Almanac, to the time and place of observation, and set the same off on the declination-plate D by means of the index I on the same, observing to set that end of the index that is toward the sun north or south of the zero-line Z on the declination-plate D, according as the sun is in north or south declination, and clamp the index I fast. Third, holding the instrument in a vertical position by the help of the cross-levels, and approximately in the meridian by means of the compass-needle, turn the declination-plate on the polar axis or pivot A backward or forward in right ascension until its plane passes through the sun, when the sun's rays, through a lens in one of the vernier-plates on the end of the index I, will fall approximately on the opposite focal point. Continue to turn the declination-plate backward or forward, in combination with a motion of the whole instrument in azimuth to the right or left, until the sun's rays through the lens fall precisely on the opposite focal point. Then the index I of the hour-circle will indicate local time. The zero-line of the compass-box will be in the true meridian, and the reading of the needle-card will show the magnetic declination. During the adjustment of the sun's rays to the focal point the instrument must be held truly vertical, and the needle must be stopped when it is settled, when the time and magnetic declination may be read at leisure. If the error of a watch or clock is to be found, the instant when the adjustment of the focal point is made should be called, when the time of the watch should be noted by an assistant, after which the error may be found at leisure by comparison with the reading of the hour-circle. To watch the needle to see when it is settled, to watch the levels and the focal point, and, at the same time, to make the adjustment required, is like reading three or four parts of music at once—something requiring practice, but still readily acquired, the difficulty not being greater than that attending the use of the sextant.

I claim—

1. The declination-plate D, arranged upon the pivot or polar axis A parallel with the optical axis of the instrument, substantially as described, and for the object herein specified.

2. The index-arm I, connected to the declination-plate D with a gimbal or universal joint, constructed substantially as herein specified, and for the purpose described.

3. The declination-plate D, graduated on both faces, constructed substantially as herein specified, and for the purpose described.

4. The combination of the pivot or polar axis A, the declination-plate D, the index-arm I, and the hour-circle H, all constructed and arranged substantially as herein specified, and for the purpose described.

HARRISON C. PEARSONS.

Witnesses:
J. A. STEPHENSON,
HENRY LACY.